(12) United States Patent
Swaminathan et al.

(10) Patent No.: US 9,116,938 B2
(45) Date of Patent: Aug. 25, 2015

(54) UPDATING INDEX INFORMATION WHEN ADDING OR REMOVING DOCUMENTS

(71) Applicant: QUALCOMM Incorporated, San Diego, CA (US)

(72) Inventors: Ashwin Swaminathan, San Diego, CA (US); Jose Jeronimo Moreira Rodrigues, San Diego, CA (US); Raghuraman Krishnamoorthi, San Diego, CA (US); Yanghai Tsin, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/836,070

(22) Filed: Mar. 15, 2013

(65) Prior Publication Data

US 2014/0280184 A1    Sep. 18, 2014

(51) Int. Cl.
*G06F 17/30* (2006.01)
(52) U.S. Cl.
CPC ............... *G06F 17/30321* (2013.01)
(58) Field of Classification Search
USPC ......................................... 707/740–747, 830
See application file for complete search history.

(56) References Cited

U.S. PATENT DOCUMENTS

| | | | |
|---|---|---|---|
| 5,920,854 A | 7/1999 | Kirsch et al. | |
| 6,823,492 B1 | 11/2004 | Ambroziak | |
| 7,725,484 B2 | 5/2010 | Nister et al. | |
| 7,991,720 B2 * | 8/2011 | Mander et al. | 706/45 |
| 2009/0234688 A1 | 9/2009 | Masuyama et al. | |
| 2010/0281030 A1 * | 11/2010 | Kusumura et al. | 707/741 |
| 2010/0306238 A1 | 12/2010 | Balakrishnan et al. | |
| 2010/0318519 A1 * | 12/2010 | Hadjieleftheriou et al. | 707/742 |
| 2011/0078152 A1 * | 3/2011 | Forman et al. | 707/747 |

FOREIGN PATENT DOCUMENTS

EP        1199647 A2    4/2002

OTHER PUBLICATIONS

Nister, D. et al. "Scalable Recognition with a Vocabulary Tree," believed to be published in CVPR, 2006, pp. 1-8.

(Continued)

*Primary Examiner* — Marc Filipczyk
(74) *Attorney, Agent, or Firm* — Silicon Valley Patent Group LLP

(57) ABSTRACT

In several aspects, an electronic device and method index a repository of N documents by W words, by not storing between queries, N*W numbers that are specific to each word i and each document j, normally used to compute a score of relevance to a query, of each document j. Instead, the electronic device and method generate the N*W word-specific -document-specific numbers dynamically at query time, based on a set of W numbers corresponding to the W words, and one or more sets (e.g. x sets) of N numbers corresponding to the N documents. Query-time generation of word-specific-document-specific numbers reduces memory otherwise required, e.g. to store these numbers. Hence, in certain aspects W+xN numbers are maintained between queries, and these numbers are changed incrementally when a new document is added to the set or an existing document is removed. Maintaining W+xN numbers reduces processing otherwise required, to start from scratch.

19 Claims, 4 Drawing Sheets

(56) References Cited

OTHER PUBLICATIONS

Robertson, S.E. et al. "Simple, proven approaches for text retrieval", Technical Report, No. 356, University of Cambridge, UK, Dec. 1994, pp. 1-8.

Fang, H. et al. "Formal Study of Information Retrieval Heuristics", SIGIR'04, Jul. 25-29, 2004, Sheffield, South Yorkshire, UK, pp. 1-8.

Zhou, H. et al. "Okapi-Chamfer Matching for Articulate Object Recognition", Proceedings of the Tenth IEEE International Conference on Computer Vision (ICCV'05), 2005, pp. 1-8.

* cited by examiner

UPDATING INDEX INFORMATION WHEN ADDING OR REMOVING DOCUMENTS

FIELD

This patent application relates to devices and methods for maintaining a search index of documents.

BACKGROUND

Database search is one of the most important problems in information retrieval. Over the years, several methods have been proposed to address this problem both in the context of text retrieval and in the context of image retrieval and object recognition. Four such prior art methods are described in the following documents, each of which is incorporated by reference herein in its entirety as background: NISTER, D. et al. "Scalable Recognition with a Vocabulary Tree," believed to be published in CVPR, 2006, pp. 1-8; ROBERTSON, S. E. et al. "Simple, proven approaches for text retrieval", Technical Report, Number 356, University of Cambridge, UK, December, 1994, pp. 1-8; FANG, H. et al. "Formal Study of Information Retrieval Heuristics", SIGIR '04, Jul. 25-29, 2004, Sheffield, South Yorkshire, UK, pp. 1-8; and ZHOU, H. et al. "Okapi-Chamfer Matching For Articulate Object Recognition", Proceedings of the Tenth IEEE International Conference on Computer Vision (ICCV '05), 2005, pp. 1-8. Another such method is described in U.S. Pat. No. 7,725,484 granted to Nister et al. on May 25, 2010, entitled "Scalable object recognition using hierarchical quantization with a vocabulary tree" that is incorporated by reference herein in its entirety, as background.

Several model based methods have been developed for rank ordering documents in a database, such as vector space models, logic-based models, and probabilistic models. Despite considerable progress in model-based approaches, it has been shown that a carefully designed metric based on Term-Frequency (TF) and Inverse-Document-Frequency (IDF) performs well in most applications. Metrics such as the Okapi score, pivoted normalization score, and normalized distance score (which are described next) have been tested with very good performance in the text retrieval literature and Normalized distance scores have shown to work well in the case for image retrieval.

Normalized distance scores is described briefly below, as per the following notations:

N: total number of documents in the database $N_i$: total number of documents in the database that contain the ith word (or visual word in the case of image retrieval)

$m_i^j$: number of occurrences of the ith word in document-j $n_i$: number of occurrences of the ith word in the query document W: total number of words in the database Normalized Distance Score:

$$s(q, d^j) = \left\| \frac{q}{\|q\|_p} - \frac{d^j}{\|d^j\|_p} \right\|_p.$$

Where $q=[q_1 \, q_2 \ldots q_W]$ and $d^j=[d_1^j \, d_2^j \ldots d_W^j]$ and $$d_i^j = m_i^j \log \frac{N}{N_i}$$

wherein $m_i^j$ is Term-Frequency (TF) and $$\log \frac{N}{N_i}$$

is Inverse-Document-Frequency (IDF)

$$q_i = n_i \log \frac{N}{N_i}$$

Computing weights $d_i^j$ and $q_i$ described above requires knowledge about the number of documents in the database. In application scenarios where the number of documents in the database is fixed, the weights $d_i^j$ and $q_i$ can be pre-computed and stored in the database. They can then be used during querying time to find the most relevant documents in the database pertaining to the query.

Inventors of the current patent application note that in scenarios when the number of documents in a database changes with time, the weights would normally need to be re-computed each time the content of the database changes and a complete re-computation can be very expensive. Accordingly, the current inventors believe that there appears to be a need for a new approach to how weights are computed and how index information is maintained, as described below.

SUMMARY

In several aspects of described embodiments, an electronic device and method index a repository of N documents (e.g. images) by a set of W words (e.g. feature vectors), by not storing between queries a total of N*W numbers, wherein each number is specific to a word i and a document j (also called "word-specific document-specific" numbers). Although the just-described numbers are used in the normal manner to compute a score of relevance of each document j to a query, N*W numbers are not stored between queries in certain aspects. Instead, such numbers are generated temporarily at run time, as and when needed, e.g. in response to receipt of the query.

Specifically, between receipt of two queries, the electronic device and method store a set of W numbers that correspond to W words, and also store one or more sets of N numbers that correspond to N documents. The set of W numbers are not associated with any specific document in the repository of N documents (and for this reason the W numbers are also referred to as "word-specific document-generic" numbers). Similarly, one or more sets (also called "x sets") of N document-specific numbers are not associated with any specific word in the set of W words (and for this reason each set of N number is also referred to as a set of "document-specific word-generic" numbers). Storing W+xN numbers (e.g. x=3 or three sets of N numbers, in addition to 1 set of W numbers) between queries eliminates the need to store N*W numbers (i.e. word-specific document-specific are not stored between queries), which reduces the amount of non-transitory computer-readable memory needed, in many aspects described herein.

The set of W word-specific document-generic numbers and one or more sets of N document-specific word-generic numbers are changed incrementally, when a new document is added to the set of N documents (or an existing document is removed). Incremental change of the W+xN numbers reduces processing required, e.g. to calculate all the word-specific-document specific numbers from scratch in response to a query, while storage of W+xN numbers requires less memory than storing all N*W numbers.

It is to be understood that several other aspects of the described embodiments will become readily apparent to those skilled in the art from the description herein, wherein it is shown and described various aspects by way of illustration. The drawings and detailed description below are illustrative, not restrictive.

DETAILED DESCRIPTION

In several aspects, an electronic device 100 indexes a set of N documents (also called "existing" documents) by a set of W words in an index (also called "existing" index) as described below. Note that in this description, a reference to only electronic device 100 is to be understood to include a server computer, because depending on the aspect either electronic device 100, or a server computer, or a combination thereof may be used as described herein.

Figure 2:
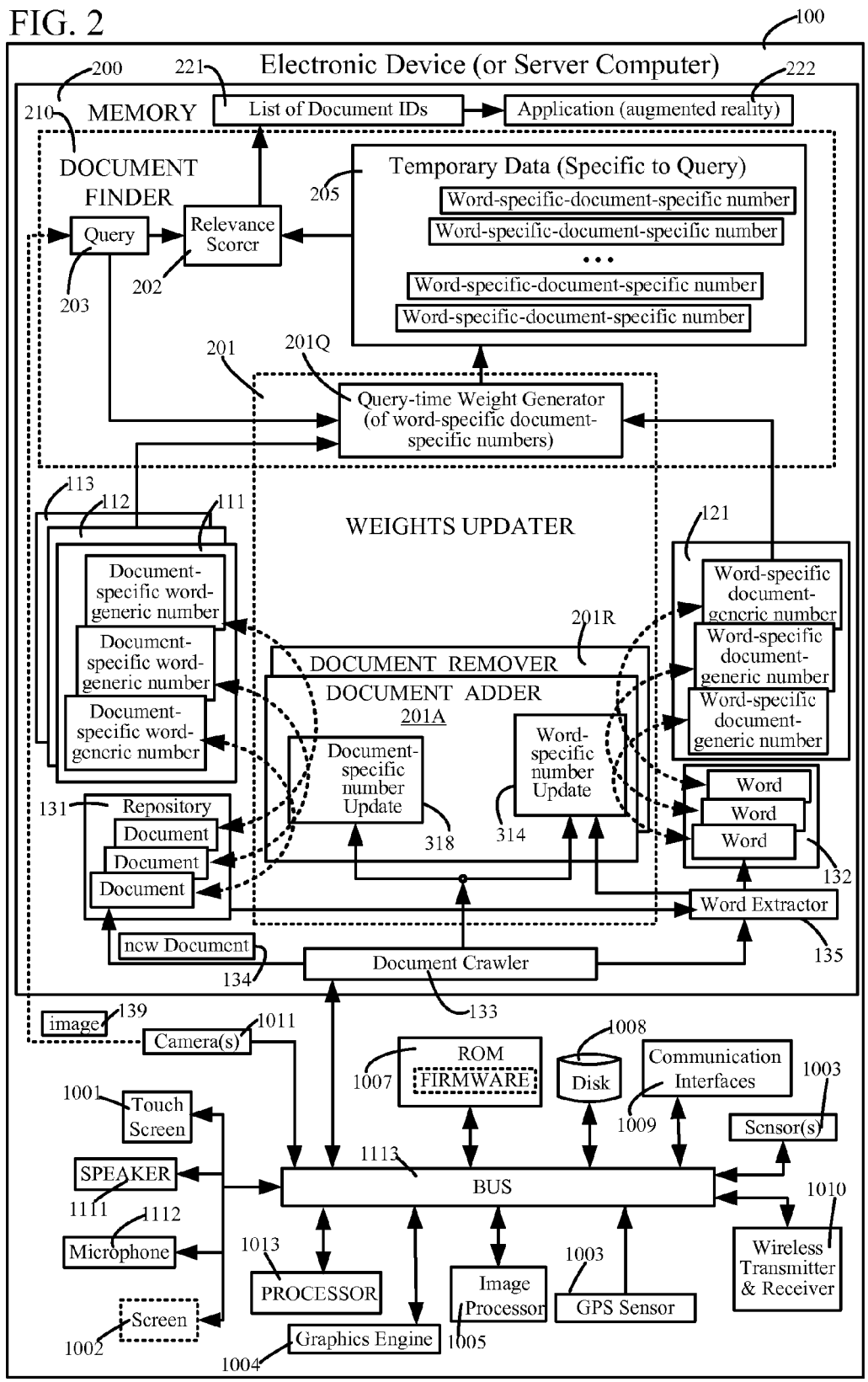
FIG. 2 illustrates, in high-level block diagram, various modules in a mobile device or server computer in some aspects of the described embodiments.

As shown in FIG. 2, an index of the type described above is stored in a memory 200 as two sets of numbers, namely one set of N first numbers (also called "existing" first numbers, or "document-specific word-generic" numbers), and another set of W second numbers (also called "existing" second numbers or "word-specific-document generic" numbers). Each number in the one set of N first numbers (also called "existing first number") corresponds to one of the N existing documents in repository 131 (FIG. 2) and each number in the set of W second numbers (also called "existing second number") corresponds to one of the W words in set 132. Note that the set of N first numbers is not associated with any specific word in the set of W words. Moreover, a set of W second numbers is also not associated with any specific document in the first of N documents. Although only one first set 111 (FIG. 2) of document-specific word-generic numbers has been described above for some aspects, other aspects may include multiple sets of document-specific word-generic numbers, such as first set 111, second set 112, and third set 113, wherein each set of document-specific word-generic numbers has N numbers, with each number in each set corresponding to one document, as will be apparent in view of this description.

Figure 1A:
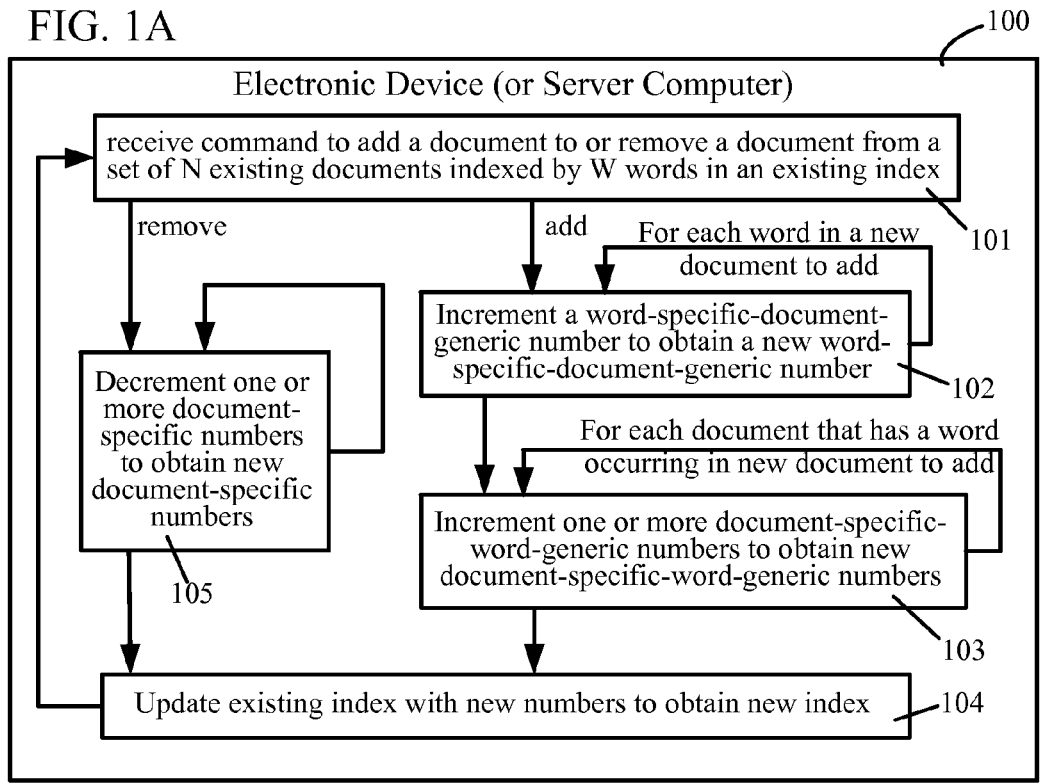
FIGS. 1A and 1B illustrate, in high-level flow charts, various acts performed by a mobile device or server computer in some aspects of the described embodiments.
Figure 1B:
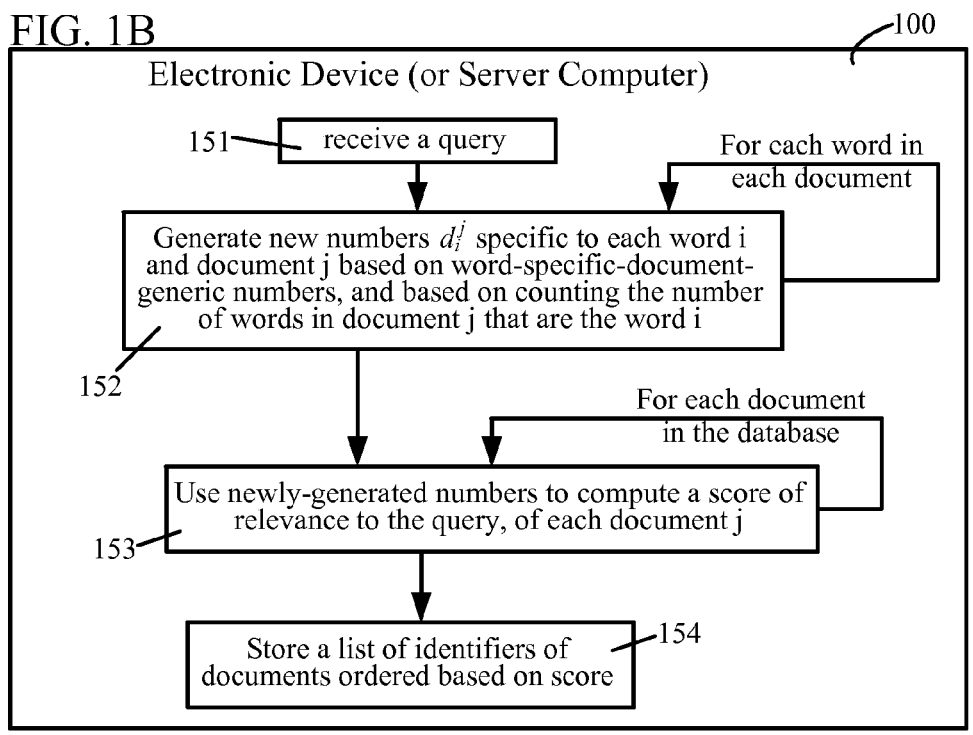

According to several aspects described herein, between queries to search among N documents in repository 131, electronic device 100 stores in memory 200 and maintains up to date the above-described first set 111, second set 112 and third set 113 as well as a fourth set 121 of word-specific-document generic numbers, i.e. a total of W+3N numbers are used, as illustrated in FIG. 1A and described below. More specifically, electronic device 100 does not maintain between queries, the N*W numbers that are normally used in query processing, wherein each number is specific to a word i and a document j (also called "word-specific-document-specific" numbers). Instead one or more such numbers are generated dynamically at query time as illustrated in FIG. 1B and described below. So, memory needed is reduced by not storing between queries, the N*W numbers.

Referring to FIG. 1A, electronic device 100 receives a new document in an act 101. A new document 134 (FIG. 2) that has been received now needs to be added to the repository 131 (FIG. 2) of N existing documents that are indexed by the set 132 (FIG. 2) of W words, in an existing index formed by first set 111, second set 112 and third set 113 as well as a fourth set 121 stored in memory 200. The new document 134 may be received from an application program, such as document crawler 133 that obtains the document from an external source, e.g. at a predetermined address on the Internet (such as Wikipedia, or Google). Hence, a specific manner in which new document 134 that was received in act 101 is obtained differs, depending on the aspect.

Next, electronic device 100 performs act 102 (FIG. 1A) repeatedly, for each word i in the new document that has been received in act 101, to increment a corresponding word-specific document-generic number 121 (FIG. 2). The just-described number 121, in some aspects is $N_i$ which denotes the number of documents in repository 131 (also called "database") that contain the word i. Hence, the number 121 to be updated in act 102 is automatically selected based on each word i that is present in the new document 134. Therefore, in act 102, for each word in the new document, its corresponding number 121 is incremented by 1 (one) to obtain a new number 121 (which is used to update in act 104, described below).

In addition, electronic device 100 performs act 103 (FIG. 1A) repeatedly, for each document j that has a word in common with the new document 134 (FIG. 2) that has been received in act 101, to increment one or more of corresponding document-specific word-generic numbers in first set 111, second set 112 and third set 113 (FIG. 2). One example of the just-described numbers in some aspects is $\|d^j\|^2$ which has been described above, in the background section. Hence, the numbers in first set 111, second set 112 and third set 113 that are to be updated in act 103 are automatically selected based on each document j that has a word in common with the new document 134. A specific amount of increment that used in act 103 can be different in different aspects, depending on whichever one or more of numbers in first set 111, second set 112 and third set 113 is being maintained between receipt and processing of any two queries.

After acts 102 and 103 are performed (in any order relative to one another), the results of these acts are used in an act 104 (FIG. 1A) as follows. Specifically, in act 104, electronic device 100 updates existing index of numbers in first set 111, second set 112 and third set 113 as well as a fourth set 121 (i.e. three sets of N numbers and one set of W numbers) that are stored in memory 200 with at least each new number obtained in acts 102 and 103, thereby to obtain a new index in the memory 200. The new index now indexes a superset of documents, namely the new document 134 and the in repository 131 of the N existing documents (FIG. 2), using the set 132 of W words.

Such an index of numbers in first set 111, second set 112 and third set 113 as well as a fourth set 121 (FIG. 2) may be used in processing a query, by generating additional numbers, such as any of the N*W numbers that may be needed for evaluating relevance of a document in repository 131 to a query, as illustrated in FIG. 1B. Note that the index of numbers in first set 111, second set 112 and third set 113 as well as a fourth set 121 is independent of the query. Specifically, in act 151, electronic device 100 receives a query (after index of numbers in first set 111, second set 112 and third set 113 as well as a fourth set 121 is already built).

In several aspects, in response to receipt of the query, a document finder 210 in electronic device 100 invokes a query-time weight generator 201Q (FIG. 2) to perform act 152 (FIG. 1B) repeatedly for each word in the query that occurs in each document. In act 152, query-time weight generator 201Q (which may be implemented by a processor 1013 programmed with software in memory 200) temporarily generates for use in relevance scores relative to the query, additional numbers or new numbers 205 (for example, number $d_i^j$) that are specific to (and corresponding to) each word i and document j, based on the W words in set 132 (FIG. 2), and based on counting the number of words in document j that are the word i (e.g. based on the number of keypoint locations of word i in document j, which may be maintained in memory 200 for other reasons, such as pose estimation).

Thereafter, a relevance scorer 202 in document finder 210 in electronic device 100 performs act 153 repeatedly for each document j in the superset, to compute a score of relevance of that document j to the query, based on the numbers that were newly generated in act 152. Finally, in act 154, electronic device 100 stores in memory 200, a list 221 (FIG. 2) of identifiers of documents ordered by the relevance score computed in act 153. The list 221 of document identifiers is then used in the normal manner, by any application program 222 (FIG. 2) in electronic device 100, e.g. to label an image that has been recognized (e.g. an image may be labeled as "Golden Gate Bridge" and displayed to the user on screen 1002).

In some aspects, a query 203 (FIG. 2) received in act 151 (FIG. 1B) is formulated by document finder 210 based on an image 139 captured by a camera 1011 (FIG. 2). Specifically, in aspects that perform image search (or object detection), feature descriptors such as SIFT, SURF, etc are extracted by a word extractor 135 (FIG. 2) from image 139 to form the query. In several such embodiments the same word extractor 135 is also used to identify the set 132 of words used to index documents in repository 131. Hence, in some embodiments, each document in repository 131 (FIG. 2) includes feature descriptors (also called "vectors"), which are extracted in an off-line manner from all images in repository 131. Accordingly, feature descriptors that are similarly extracted, e.g. by an electronic device 100 (see FIGS. 1A, 1B and 2) from image 139 to form a query are compared with feature descriptors of images in repository 131 in act 152, to find a closest match in act 153.

In several aspects, electronic device 100 uses normalized distance to perform the comparison in act 152 although other metrics are used in other aspects. Normalized distance is a popular metric and has been shown to perform well for image search and hence it is used in some augmented reality (AR) applications in electronic device 100.

Comparing each feature descriptor in a query with each feature descriptor in the database can be cumbersome if repository 131 is large, and hence tree structures such as Hierarchical K-means Tree, k-d trees, or vocabulary trees may be used to obtain one or more identifiers of documents in repository 131 that match the query, to reduce the complexity in finding the nearest neighbors. The leaves of a tree structure in repository 131 may form visual words in the case of image search, and the number of visual words in repository 131 depends on the parameters of the tree structure.

Figure 3A:
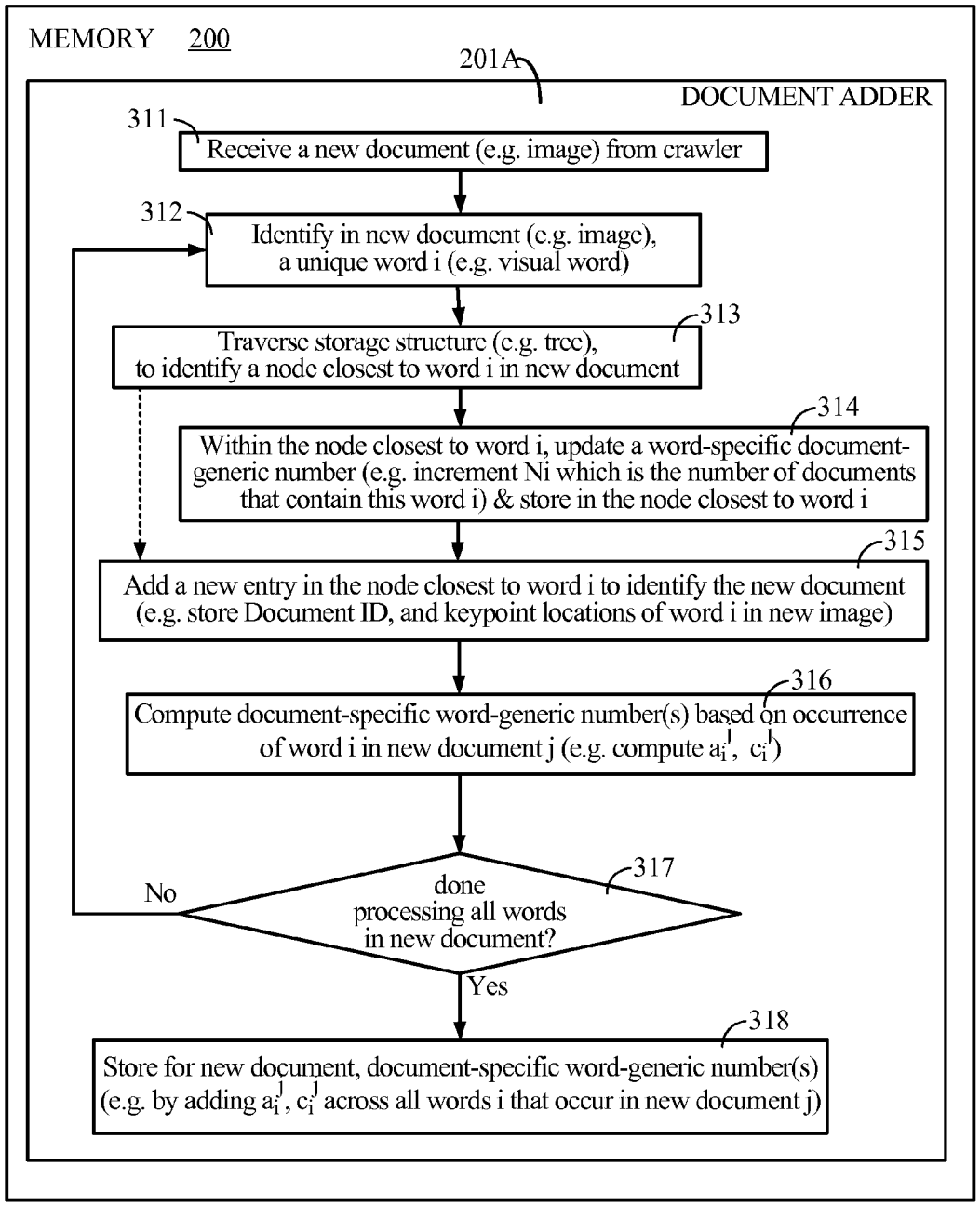
FIGS. 3A and 3B illustrate, in intermediate-level flow charts, various acts performed by a document adder and a document finder that are included in a mobile device or server computer in some aspects of the described embodiments.

Given an electronic device 100 that uses a tree (such as a vocabulary tree) having a fixed structure (e.g. no change in the number of leaf nodes and no change in connections of leaf nodes to root node via intermediate nodes) to hold words in set 132 and word-specific document-generic numbers in fourth set 121, certain methods of the type described herein include a weights updater 201 (FIG. 2) that can update the numbers in first set 111, second set 112 and third set 113 as well as a fourth set 121 when inserting new documents to and when removing existing documents from leaf nodes in the tree structure. Specifically, weights updater 201 (which may be implemented by a processor 1013 programmed with software in memory 200) includes a document adder 201A and a document remover 201R. Document adder 201A updates the document-specific word-generic numbers in first set 111, second set 112 and third set 113 e.g. by performing an operation 318 (also called document-specific number update operation) shown in FIG. 3A. Document adder 201A updates the word-specific document-generic numbers in fourth set 121 e.g. by performing another operation 314 (also called word-specific number update operation) also shown in FIG. 3A.

At query time, the above-described numbers in first set 111, second set 112 and third set 113 as well as a fourth set 121 are used by query-time weight generator 201Q (FIG. 2) to generate the above-described weights for Term-Frequency (TF) and Inverse-Document-Frequency (IDF). Instead of re-computing the TF-IDF weights from scratch for each database update caused by addition or removal of an image to repository 131, electronic device 100 may use various methods to compute the weights with few computations and with low memory usage.

Following the terminology of the article by D. Nister and H. Stewenius, entitled "Scalable recognition with a vocabulary tree," incorporated by reference above, each query and database images (documents) can be represented by the query vector q and the database vectors $d^j$ defined as $$d_i^j = m_i^j \log \frac{N}{N_i}$$

wherein $m_i^j$ is Term-Frequency (TF) and $$\log \frac{N}{N_i}$$

is Inverse-Document-Frequency (IDF), $$q_i = n_i \log \frac{N}{N_i}$$

where i=1, ..., W indexes the entries of the vectors, W is the number of leaf nodes, $m_i^j$ and $n_i$ are the number of descriptor vectors passing through leaf i, N is the number of documents in the database, and $N_i$ is the number of images in the database that have descriptor vectors passing through leaf i.

For the image search (or object detection) task, a database image (or document) is given a relevance score based on the normalized distance, in $L_p$-norm between the query and database vectors $$s(q, d^j) = \left\| \frac{q}{\|q\|_p} - \frac{d^j}{\|d^j\|_p} \right\|_p.$$

For $L_2$-norm (e.g., p=2), this relevance score can be re-written as $$s(q, d^j) = 2 - 2\frac{q^T d^j}{\|q\| \|d^j\|} = 2 - 2\frac{\sum_{q_i \neq 0} q_i d_i^j}{\|q\| \|d^j\|}.$$

During querying time, the score is computed by electronic device 100 and the documents (or database images) are rank ordered based on the score. Lower the score implies that the query image (or query document) is more similar to the particular database document.

In several implementations of electronic device 100, relevance based scoring uses various comparison metrics such as Normalized distance (and others such as Okapi, etc), the $m_i^j$ are stored for each document j and word i in the form of the Term Frequency (TF) table which may be of size N*W (or smaller), depending on the embodiment. Additionally, in some aspects of electronic device 100, the $N_i$ is stored either directly or in terms of the weights $$w_i = \log \frac{N}{N_i}.$$

By means of an example, consider a scenario where in the electronic device 100 is designed for N=1000 documents in the repository 131 (also called database). Each document typically contains 1000-2000 words and the total database has around $10^5$ to $10^6$ words. In the case of image search, the number of visual words in set 132 is equal to the number of leaves of a tree structure (as noted above). To retain good object recognition performance for 1000 documents, electronic device 100 is designed to use a tree structure with approximately $10^5$ leaves (to hold a corresponding number of words in set 132). In such a system, storing the TF table requires $10^5 \times 10^3 \times 2$ bytes and the IDF weights additionally require $10^5 \times 4$ bytes. Such large memory requirements make the system infeasible to run on memory constrained devices such as mobile phones. Accordingly, electronic device 100 of some aspects uses a new approach described herein to compute this weight by storing and using side information, without any loss in performance even when implemented as a mobile device, such as a smartphone or head-mounted glasses.

Instead of storing $d_i^j$ (or $m_i^j$) for each document j, electronic device 100 of some aspects computes $d_i^j$ at the time of querying. In electronic device 100 of some aspects, $q^T d^j$ and $\|q\|$ are computed at query time and $\|d^j\|$ is computed offline. Storing $\|d^j\|$ does not require too much memory in electronic device 100 of some aspects (as only one number is stored per document or image in repository 131). Computing this one number $\|d^j\|$ is computationally heavy, since it requires a transverse of all the elements in all the leaves of the tree (and is therefore done offline, and stored for use at query time). Electronic device 100 of some aspects may express $\|d^j\|^2$ for the j document in repository 131 as:

$$\|d^j\|^2 = \sum_{i=1}^{W} \left( m_i^j \log \frac{N}{N_i} \right)^2 = \sum_{i=1}^{W} m_i^{j2} \log^2 \frac{N}{N_i} \quad (1)$$

Several embodiments of electronic device 100 maintain $\|d^j\|$ updated using low amount of memory and performing few computations, instead of computing them from scratch, as described next. In the following, we show how to update the weights $\|d^j\|^2$ from scratch.

Expanding expression (1), write $\|d^j\|^2$ as $$\|d^j\|^2 = \left( \sum_{i=1}^{W} m_i^{j2} \right) \log^2 N + \left( \sum_{i=1}^{W} m_i^{j2} \log^2 N_i \right) - 2 \left( \sum_{i=1}^{W} m_i^{j2} \log N_i \right) \log N.$$

Since the sum shown inside parenthesis can be represented just by one number per document, re-write this expression as $$\|d^j\|^2 = a^j \log^2 N + b^j - 2c^j \log N \quad (2)$$

where $$a^j = \left( \sum_{i=1}^{W} m_i^{j2} \right) \quad (3)$$

$$b^j = \left( \sum_{i=1}^{W} m_i^{j2} \log^2 N_i \right)$$

$$c^j = \left( \sum_{i=1}^{W} m_i^{j2} \log N_i \right) \quad (4)$$

Equations (1) to (4) are used in electronic device 100 of some aspects to update $\|d^j\|$ as described herein by just storing a vector containing $N_i$ for each leaf node, the number of documents N, and 3 numbers per database document, i.e., $\|d^j\|^2$, $a^j$, and $c^j$.

In the example considered, note that storing these three numbers per document or image in repository 131 only requires 3×1000×4 bytes for the entire set of 1000 documents as in the earlier example. This is a significant reduction in the amount of memory required in electronic device 100 of some aspects.

In addition to this, electronic device 100 of some aspects stores labels (visual words) of the keypoints corresponding to each document to be inserted into in repository 131 or removed from in repository 131. Labels are required to ensure that electronic device 100 of some aspects visits only the necessary nodes having certain labels to remove the content in the leaves of a vocabulary tree referring to the document being removed, instead of traversing all leaves in the tree and exhaustively searching for keypoints information to be removed.

How to update $\|d^j\|^2$, or adding images in electronic device 100 of some aspects is now described. Updates for adding an image may be performed in two steps, as shown below.

Step 1: Let VW represent the set of non-repeated visual words in the document that needs to be added to the database and inserted into the tree. Then, for document-j we update its $\|d^j\|^2$ as follows $$^{intermediate}\|d^j\|^2 = {}^{old}\|d^j\|^2 + \sum_{i \in VW} m_i^{j2}\left(\log^2\frac{^{old}N}{^{old}N_i+1} - \log^2\frac{^{old}N}{^{old}N_i}\right)$$

$$^{new}a^j = {}^{old}a^j + \sum_{i \in VW} m_i^{j2}$$

$$^{new}c^j = {}^{old}c^j + \sum_{i \in VW} m_i^{j2} \log\left(\frac{^{old}N_i+1}{^{old}N_i}\right)$$

$$^{new}N_i = {}^{old}N_i + 1.$$

For $j={}^{old}N+1$, the following quantities are computed and updated:

$$^{new}a^j = \sum_{i \in VW} m_i^{j2}$$

$$^{new}c^j = \sum_{i \in VW} m_i^{j2} \log({}^{new}N_i)$$

Step 2: If we store, for each database document, $a^j$, and $c^j$, in equations (3) and (4) we can finally finish updating $\|d^j\|^2$ $$^{new}\|d^j\|^2 = {}^{intermediate}\|d^j\|^2 + {}^{new}a^j(\log^2 {}^{new}N - \log^2 {}^{old}N)$$

$$- 2\,^{new}c^j(\log{}^{new}N - \log{}^{old}N)$$

$$^{new}N = {}^{old}N + 1.$$

Note that the same approach can be used for adding one new document, or for batch adding of any number of new documents.

How to update $\|d^j\|^2$, for removing images in electronic device 100 of some aspects is now described. Updates for removing an image may be performed in two steps, as shown below. Note that the label information stored can easily help identify the location of nodes which contain keypoints corresponding to the object to be removed.

Step 1: Let VW represent the set of non-repeated visual words in the document that needs to be removed from the database and from the tree. Then, for document-j we update its $\|d^j\|^2$ as follows $$^{intermediate}\|d^j\|^2 = {}^{old}\|d^j\|^2 + \sum_{i \in VW} m_i^{j2}\left(\log^2\frac{^{old}N}{^{old}N_i-1} - \log^2\frac{^{old}N}{^{old}N_i}\right)$$

$$^{new}a^j = {}^{old}a^j + \sum_{i \in VW} m_i^{j2}$$

$$^{new}c^j = {}^{old}c^j + \sum_{i \in VW} m_i^{j2} \log\left(\frac{^{old}N_i-1}{^{old}N_i}\right)$$

$$^{new}N_i = {}^{old}N_i - 1.$$

Step 2: If we store, for each database document, $a^j$, and $c^j$, in equations (3) and (4) we can finally finish updating $\|d^j\|^2$ $$^{new}\|d^j\|^2 = {}^{intermediate}\|d^j\|^2 + {}^{new}a^j(\log^2 {}^{new}N - \log^2 {}^{old}N)$$

$$- 2\,^{new}c^j(\log{}^{new}N - \log{}^{old}N)$$

$$^{new}N = {}^{old}N + 1.$$

Note that the same approach can be used for adding one new document, or for batch adding of any number of new documents.

Updates using the methods of the type described above are very efficient, and in some embodiments take around 2-3 milliseconds on a personal computer (PC), per object.

In some embodiments, a processor 1013 of electronic device 100 is programmed with software in memory 200 to implement a document adder 201A in weights updater 201 (FIG. 2), by performing the acts 311-318 (FIG. 3A) as follows. Specifically, in act 311, document adder 201A receives a new document 134 (e.g. an image) to be added to repository 131 from a document crawler 133 (FIG. 2). Subsequently in act 312 (FIG. 3A), document adder 201A identifies a unique word i (e.g. a visual word) that occurs in the new document 134 (e.g. image), e.g. by looking up a list of words that have been identified as occurring in new document 134 by word extractor 135 (FIG. 2). Depending on the embodiment, word extractor 135 may be invoked by document adder 201A, or alternatively by document crawler 133.

After a unique word i is identified in act 312, document adder 201A goes to act 313 and traverses a storage structure (such as a tree, e.g. vocabulary tree) to identify a node (also called "storage element") that is closest to word i. A specific manner in which the storage structure (which includes such storage elements) is implemented and accessed can be different, depending on the embodiment. Note that the storage elements of some embodiments (which form the respective nodes) are implemented in memory 200 as memory locations, and each storage element may be identified by an address in memory 200 at which information of a node is stored.

Several embodiments of electronic device 100 store keypoint locations (e.g. x, y coordinates) of each visual word that occurs in a repository document, in the leaf nodes of a tree, along with the document IDs (i.e. unique identifiers) of the documents in repository 131. In some embodiments of the type described above, values of $m_i^j$ are not explicitly stored and instead $m_i^j$ is computed at query processing time, based on the document IDs that are stored in each leaf node. Moreover, in other nodes (other than leaf nodes), certain embodiments of electronic device 100 do not store anything. Between two successive queries, several embodiments store in memory 200, the following three values: $\|d^j\|$, $a^j$, $c^j$ for each document j, in repository 131.

In certain embodiments, a tree of the type described above has, in addition to the leaf nodes described above, several intermediate nodes and a root node. For every node in the tree, such embodiments know its co-ordinate in feature space (e.g. a space defined by feature descriptors or feature vectors). If the feature space is n-dimensional, then this could be a n-dimensional vector, in the case of vocabulary tree implementations. For the intermediate nodes, such embodiments additionally know the index of its child nodes so that the tree can be traversed.

After a node (or storage element) which is closest to word i (e.g. in a query image) is identified (e.g. using a normalized distance score of the type described above), document adder 201A goes to act 314 and within this node, updates a word-specific document-generic number, e.g. increments by 1 a value of number $N_i$ (which, as noted above, is the number of documents that contain word i in this node), followed by storing the updated number Ni in the node. Note that act 314 is optional, and may be skipped in certain embodiments that compute this number Ni at query time, based on document identifiers (ID) stored in this node as described next.

In an act 315 (which may be performed either directly after act 313 described above), or after act 314, document adder 201A adds to the node identified in act 313 (as being closest to the word i) a new entry for the new document. Specifically, in some embodiments, the new entry added by document adder 201A includes the following: (a) Document ID which uniquely identifies the new document in repository 131 (b) a list of keypoint locations in the form of x, y coordinates at which the word i (e.g. visual word) occurs in the new document (e.g. image).

After act 315, document adder 201A goes to act 316 and updates one or more document-specific word-generic number(s) based on information related to word i in the new document. For example, in act 316, document adder 201A computes the following: $a_i^j$, $c_i^j$, and $b_i^j$ which are computed based on $m_i^j$ and $N_i$ for the word i to which the current node is closest. Subsequently, in act 317, document adder 201A checks whether all words in the new document have been processed and if not returns to act 312 (described above). When all words in the new document have been processed, then document adder 201A goes from act 317 to act 318.

Figure 3B:
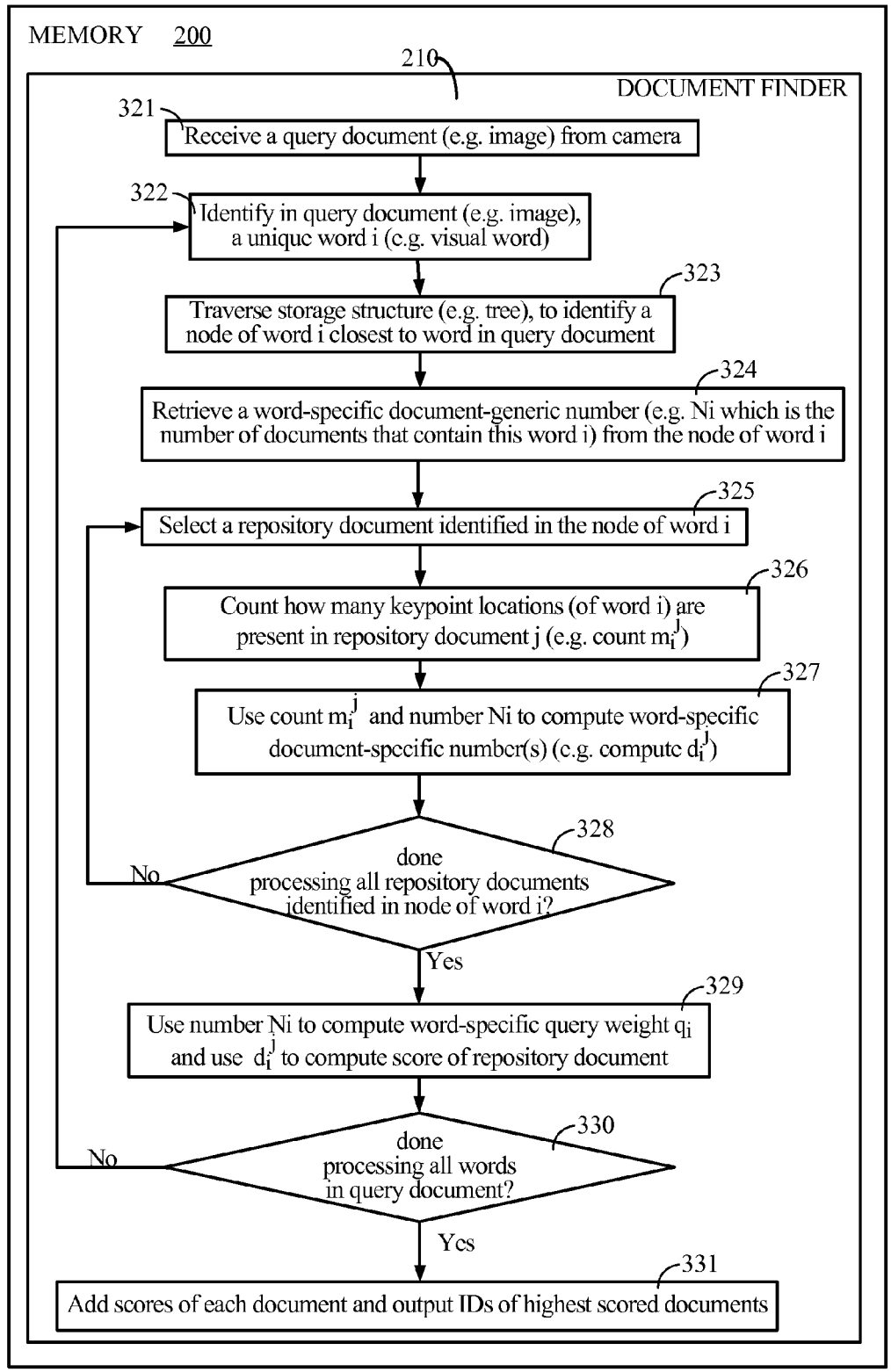

In act 318, document adder 201A computes the final values of document-specific word-generic number(s) which are stored in memory 200, for subsequent use by query-time weight generator 201Q (FIG. 2), invoked by document finder 210 (FIG. 3B). Specifically, in act 318, document adder 201A sums up the above-described $a_i^j$, $c_i^j$, which were computed in act 316 across all words i that occur in document j, to obtain final values of $a^j$, $c^j$. Moreover, the values $b_i^j$ also computed in act 316 are now used in act 318 with the values $a^j$, $c^j$ to calculate $\|d^j\|^2$ as described above. Accordingly, on completion of act 318 three numbers in first set 111, second set 112 and third set 113 are stored in memory 200 for the document j, as follows: $\|d^j\|$, $a^j$, $c^j$.

In some embodiments, a processor 1013 of electronic device 100 is further programmed with software in memory 200 to implement a document finder 210 (FIG. 2), by performing acts 321-331 (FIG. 3B) as follows. Specifically, in act 321, document finder 210 receives, e.g. from a camera, a query document (e.g. an image 139) to be matched to a document existing in repository 131. Subsequently in act 322 (FIG. 3B), document finder 210 identifies a unique word i (e.g. a visual word) that occurs in the query document (e.g. image 139), e.g. by looking up a list of words that have been identified as occurring in image 139 by word extractor 135 (FIG. 2), which is invoked by document finder 210 in act 322.

After a unique word i is identified in act 322, document finder 210 goes to act 323 and traverses the above-described storage structure (such as a tree, e.g. vocabulary tree) to identify the node that is closest to word i identified in the image 139. After the node closest to word i is identified (also called "current node"), document finder 210 goes to act 324 and retrieves from this node, a word-specific document-generic number, e.g. retrieves a value of number $N_i$. In certain embodiments that do not perform act 314 (described above), document finder 210 may determine the value of number $N_i$ in act 324 implemented in another manner e.g. by counting up the number of documents in repository 131 identified in the current node.

Thereafter, document finder 210 goes to act 325 and enters a loop, over all the documents in repository 131 that are identified in the current node. Specifically, in act 325, document finder 210 selects a repository document identified in the current node, and goes to act 326. In act 326, document finder 210 counts how many keypoint locations (of word i) are identified in the current node as being present in the selected repository document. Hence, in this manner, by counting the document finder 210 determines the value of $m_i^j$. Then, document finder 210 goes to act 327 and uses $m_i^j$ and $N_i$ to compute one or more word-specific document-specific numbers, such as $d_i^j$.

Subsequently, document finder 210 goes to act 328 and checks whether all repository documents identified in the current node have been processed and if not returns to act 325 (described above). When all repository documents identified in the current node (which is closest to word i as noted above) have been processed, then document adder 201A goes from act 328 to act 329. In act 329, document finder 210 uses the number $N_i$ to compute a word-specific weight for the query, i.e. for image 139. This word-specific weight for the query is used by document finder 210, in act 329 with the word-specific document-specific number, such as $d_i^j$ to compute a partial score of the repository document for its relevance to the query i.e. for image 139. Then, document finder 210 goes to act 330 to check if all words in the query, i.e. image 139 have been processed and if not returns to act 325 (described above). When all words in the query, i.e. image 139 have been processed, document finder 210 goes to act 331. In act 331, document finder 210 adds up partial scores to obtain total scores of repository documents, and then outputs a list 221 (FIG. 2), which contains a predetermined number (e.g. 10) of the highest scored documents.

An apparatus of some aspects that implements the one or more of above-described steps, may be, for example, a mobile device, such as a smartphone that includes sensors 1003 (FIG. 2), such as accelerometers, gyroscopes or the like, which may be used in the normal manner. Such an electronic device 100 may additionally include a graphics engine 1004 and an image processor 1005 that are used in the normal manner. Electronic device 100 may optionally include other types of memory such as flash memory (or SD card) or hard disk 1008 to store data and/or software for use by processor(s) 1013. Electronic device 100 may further include a wireless transmitter and receiver in transceiver 1010 and/or any other communication interfaces. It should be understood that electronic device 100 may be any portable electronic device such as a cellular or other wireless communication device, personal communication system (PCS) device, personal navigation device (PND), Personal Information Manager (PIM), Personal Digital Assistant (PDA), laptop, camera, smartphone, or other suitable mobile platform that is capable of creating an augmented reality (AR) environment.

An electronic device 100 of the type described above may use position determination methods and/or object recognition methods based on "computer vision" techniques. The electronic device 100 may also include means for remotely controlling a real world object which may be a toy, in response to user input on electronic device 100 e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. The electronic device 100 may further include, in a user interface, a microphone 1112 and a speaker 1111. Of course, electronic device 100 may include other elements unrelated to the present disclosure, such as a read-only-memory 1007 which may be used to store firmware for use by processor 1013.

Although several aspects are illustrated in connection with specific embodiments for instructional purposes, the present embodiments are not limited thereto. Hence, although an electronic device 100 shown in FIG. 2 of some embodiments is a smartphone, in other embodiments such an apparatus is implemented by use of form factors that are different, e.g. in certain other embodiments, the electronic device 100 is a mobile platform (such as an iPad available from Apple, Inc.) while in still other embodiments such an electronic device 100 is any apparatus or system. Illustrative embodiments of such an electronic device 100 may include multiple physical parts that intercommunicate wirelessly, such as a processor and a memory that are portions of a stationary computer, such as a lap-top computer, a desk-top computer or a server computer communicating wirelessly with sensors and user input circuitry in a housing that is small enough to be held in a hand.

Various software components or application programs of some embodiments are configured to provide information to a relevance scorer 202 that is useful to identify documents of interest to a user, in response to a query from the user. In some illustrative examples, a browser app, such as FIREFOX may supply a query 203 of key words to be used in identifying documents; based on this query 203, relevance scorer 202 uses word-specific document-specific numbers that are generated as temporary data at query time by weights updater 201.

Depending on the embodiment, various functions of the type described herein may be implemented in an electronic device 100 (or in a server computer) in software (executed by one or more processors or processor cores) or in dedicated hardware circuitry or in firmware, or in any combination thereof. Accordingly, depending on the embodiment, any one or more of word extractor 135, relevance scorer 202, and weights updater 201 illustrated in FIG. 2 and described above can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of non-transitory computer-readable storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware in ROM 1007 (FIG. 2) or software, or hardware or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any non-transitory machine-readable medium tangibly embodying computer instructions may be used in implementing the methodologies described herein. For example, relevance scorer 202, and weights updater 201 (FIG. 2) may include program codes stored in memory and executed by processor 1013. Memory 200 may be implemented within or external to the processor 1013. If implemented in firmware and/or software, the functions may be stored as one or more computer instructions or code on a non-transitory computer-readable medium. Examples include non-transitory computer-readable storage media encoded with a data structure (such as a sequence of images) and non-transitory computer-readable media encoded with a computer program (such as weights updater that can be executed to perform the method of FIGS. 1A and 1B).

Non-transitory computer-readable media includes physical computer storage media. A non-transitory storage medium may be any available non-transitory medium that can be accessed by a computer. By way of example, and not limitation, such non-transitory computer-readable media can comprise RAM, ROM, Flash Memory, EEPROM, CD-ROM or other optical disk storage, magnetic disk storage or other magnetic storage devices, or any other non-transitory medium that can be used to store program code in the form of software instructions (also called "processor instructions" or "computer instructions") or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Various adaptations and modifications may be made without departing from the scope of the invention. Therefore, numerous modifications and adaptations of the embodiments and aspects described herein are encompassed by the attached claims.

The invention claimed is:

1. A method to index documents by words occurring therein, the method comprising:

receiving a new document, to be added to a repository of N existing documents that are indexed by a set of W words in an existing index stored in a non-transitory computer-readable memory;

wherein the existing index comprises a first set of existing first numbers and a second set of W existing second numbers;

wherein each of the existing first numbers in the first set has a first correspondence to one of N existing documents and each existing second number has a second correspondence to one of W words;

wherein the first set of the existing first numbers is not associated with any specific word in the set of W words and the second set of W existing second numbers is not associated with any document in the repository of N existing documents;

in the repository of N existing documents, for each existing document that contains a word in common with the new document, incrementing an existing first number selected from the first set based on the first correspondence to said existing document, to obtain a new first number in the non-transitory computer-readable memory;

in the set of W words, for each word that occurs in the new document, at least one processor incrementing the existing second number selected from the second set of W existing second numbers based on the second correspondence to said each word, to obtain a new second number in the non-transitory computer-readable memory; and updating the existing index with at least the new first number and at least the new second number, to obtain a new index in the non-transitory computer-readable memory, wherein a superset comprises the new document and the repository of N existing documents, and wherein the superset is indexed by the set of W words.

2. The method of claim 1 wherein:
the existing index and the new index are independent of a query;
the method further comprising, responding to receipt of the query by generating additional numbers, based at least partially on the new first number and the new second number in the new index;
each additional number is associated with a corresponding word i in the set of W words and a specific document j in the superset.

3. The method of claim 1 wherein:
each of N existing documents comprises an image; and
the set of W words are visual words.

4. The method of claim 3 further comprising:
using a camera to capture an additional image; and
using the additional image to extract a visual word to be comprised in a query.

5. The method of claim 1 wherein:
the existing index comprises a third set of N existing third numbers, each existing third number corresponding to said one of N existing documents.

6. The method of claim 5 wherein:
the existing index comprises a fourth set of N existing fourth numbers, each existing fourth number corresponding to said one of N existing documents.

7. The method of claim 6 further comprising:
for said existing document, obtaining a new fourth number in a new version of the fourth set of N existing fourth numbers by using:
  a corresponding existing fourth number in the fourth set of N existing fourth numbers;
  another increment for said each word i in a subset of W words that occur in the new document;
  the new first number in the new version of the first set;
  the new second number in the new version of the second set of W existing second numbers;
  a new third number in the new version of the third set of N existing third numbers; and
storing in the non-transitory computer-readable memory at least the new fourth number in the new version of the fourth set of N existing fourth numbers as another portion of the new index.

8. The method of claim 5 further comprising:
for said existing document, obtaining a new third number in a new version of the third set of N existing third numbers by incrementing a corresponding existing third number with an increment for each word i in a subset of W words that occur in the new document; and
storing in the non-transitory computer-readable memory, at least the new third number in the new version of the third set of N existing third numbers as a portion of the new index.

9. The method of claim 8 wherein:
the increment comprises a product obtained by multiplying (A) square of a number of occurrences, in said existing document, of said each word occurring in the new document, with (B) a natural logarithm of the existing first number in the first set.

10. The method of claim 8 wherein:
the increment comprises a square of a number of occurrences, in said existing document, of said each word occurring in the new document.

11. An electronic device comprising:
a camera;
a non-transitory computer-readable memory operatively connected to the camera;
one or more processors operatively connected to the non-transitory computer-readable memory;
wherein the non-transitory computer-readable memory comprises a plurality of instructions to index documents by words occurring therein, the plurality of instructions in the non-transitory computer-readable memory comprising:
first instructions to the one or more processors to receive a new document, to be added to a repository of N existing documents that are indexed by a set of W words in an existing index stored in the non-transitory computer-readable memory;
wherein the existing index comprises a first set of existing first numbers and a second set of W existing second numbers;
wherein each of the existing first numbers in the first set has a first correspondence to one of N existing documents and each existing second number in the second set of W existing second numbers has a second correspondence to one of W words;
wherein the first set of the existing first numbers is not associated with any specific word in the set of W words and the second set of W existing second numbers is not associated with any document in the repository of N existing documents;
second instructions to the one or more processors, to be executed for each existing document that contains a word in common with the new document, to increment an existing first number selected from the first set based on the first correspondence to said existing document, to obtain a new first number in the non-transitory computer-readable memory;
third instructions to the one or more processors, to be executed for each word that occurs in the new document, to change the existing second number selected from the second set of W existing second numbers based on the second correspondence to said each word, to obtain a new second number in the non-transitory computer-readable memory; and
fourth instructions to the one or more processors, to update the existing index with at least the new first number and at least the new second number, to obtain a new index in the non-transitory computer-readable memory, wherein a superset comprising the new document and the repository of N existing documents is indexed by the set of W words in the new index.

12. The electronic device of claim 11 wherein:
the existing index and the new index are independent of a query;
the query comprises an image captured by the camera;
the plurality of instructions in the non-transitory computer-readable memory further comprise:
fifth instructions, responsive to receipt of the query, to generate additional numbers, based at least partially on new first numbers and new second numbers in the new index;
each additional number is associated with a word i in the set of W words and the document j in the superset.

13. The electronic device of claim 11 wherein:
each of N existing documents comprises an image; and
the set of W words are visual words.

14. One or more non-transitory computer-readable media comprising a plurality of instructions which, when executed by one or more processors, cause the one or more processors to perform operations, the plurality of instructions comprising first instructions to receive a new document, to be added to a repository of N existing documents that are indexed by a set of W words in an existing index;

wherein the existing index comprises a first set of existing first numbers and a second set of W existing second numbers;

wherein each of the existing first numbers in the first set has a first correspondence to one of N existing documents and each existing second number in the second set of W existing second numbers has a second correspondence to one of W words;

wherein the first set of the existing first numbers is not associated with any specific word in the set of W words and the second set of W existing second numbers is not associated with any document in N existing documents;

second instructions to be executed for each existing document that contains a word in common with the new document, to increment an existing first number selected from the first set based on the first correspondence to said existing document, to obtain a new first number;

third instructions to be executed for each word that occurs in the new document, to change the existing second number selected from the second set of W existing second numbers based on the second correspondence to said each word, to obtain a new second number; and fourth instructions to update the existing index with at least the new first number and at least the new second number, to obtain a new index, wherein a superset comprising the new document and the repository of N existing documents is indexed by the set of W words in the new index.

15. The one or more non-transitory computer-readable media of claim 14 wherein:

the existing index and the new index are independent of a query;

the plurality of instructions further comprise fifth instructions, responsive to receipt of the query, to generate additional numbers, based at least partially on new first numbers and new second numbers in the new index;

each additional number is associated with a word i in the set of W words and the document j in the superset.

16. The one or more non-transitory computer-readable media of claim 14 wherein:

each of N existing documents comprises an image; and
each W word is a visual word.

17. An apparatus that indexes documents by words occurring therein, the apparatus comprising:

means for receiving a new document, to be added to a repository of N existing documents that are indexed by a set of W words in an existing index stored in a non-transitory computer-readable memory;

wherein the existing index comprises a first set of existing first numbers and a second set of W existing second numbers;

wherein each of the existing first numbers in the first set has a first correspondence to one of N existing documents and each existing second number in the second set of W existing second numbers has a second correspondence to one of W words;

wherein the first set of the existing first numbers is not associated with any specific word in the set of W words and the second set of W existing second numbers is not associated with any document in the repository of N existing documents;

means, to be operated for each existing document that contains a word in common with the new document, for incrementing an existing first number selected from the first set based on the first correspondence to said existing document, to obtain a new first number;

means, to be operated for each word that occurs in the new document, for incrementing the existing second number selected from the second set of W existing second numbers based on the second correspondence to said each word, to obtain a new second number; and means for updating the existing index with at least the new first number and at least the new second number, to obtain a new index, wherein a superset comprising the new document and the repository of N existing documents is indexed by the set of W words in the new index.

18. The apparatus of claim 17 wherein:

the existing index and the new index are independent of a query;

the apparatus further comprises means, responsive to receipt of the query, for generating additional numbers, based at least partially on new first numbers and new second numbers in the new index;

each additional number is associated with a word i in the set of W words and the document j in the superset.

19. The apparatus of claim 17 wherein:

each of N existing documents comprises an image; and
the set of W words are visual words.

* * * * *